United States Patent [19]

Simone

[11] Patent Number: 5,390,629
[45] Date of Patent: Feb. 21, 1995

[54] PET TOY

[76] Inventor: James Simone, P.O. Box 474, Rockaway, N.J. 07866

[21] Appl. No.: 165,954

[22] Filed: Dec. 13, 1993

[51] Int. Cl.$^6$ ............................................. A01K 29/00
[52] U.S. Cl. .................................... 119/711; 446/419
[58] Field of Search ............... 119/707, 711; 446/72, 446/73, 419

[56] References Cited

U.S. PATENT DOCUMENTS

| | | | |
|---|---|---|---|
| 3,464,151 | 9/1969 | Motley | 446/419 X |
| 3,630,172 | 12/1971 | Neumann | 446/73 X |
| 4,154,018 | 5/1979 | Churchman | 446/419 |
| 4,720,283 | 1/1988 | Williams et al. | 446/419 X |
| 4,727,825 | 3/1988 | Houghton | 119/707 |
| 4,841,911 | 6/1989 | Houghton | 119/707 X |

Primary Examiner—Gene Mancene
Assistant Examiner—Thomas Price

[57] ABSTRACT

A pet toy has a transparent container and a visible figure slidably fitted inside the cylinder. A bell can be fitted inside the container to make a sound in response to motion of the container. The container also has a spaced plurality of longitudinal slots to make the figure partially accessible.

24 Claims, 1 Drawing Sheet

PET TOY

BACKGROUND OF THE INVENTION

1. Field of the Invention

The present invention relates to pet toys and, in particular, to toys that can provide a visual or audible stimulus.

2. Description of the Related Art

Pet owners prefer pet toys that are able to provide sustained amusement for the pet. A disadvantage with known pet toys is the limited modes of stimulus offered by them.

In U.S. Pat. No. 1,441,095 a mesh cylinder contains a mouse filled with catnip. This toy however, gives limited stimulus considering the obstructed view of the artificial mouse inside the cylinder. In addition, the pet has no opportunity to touch the artificial mouse. Moreover, the toy does not provide an audible stimulus. See also U.S. Pat. No. 1,534,964 showing a sphere, having a number of holes and containing an artificial mouse filled with catnip.

In U.S. Pat. No. 3,315,640, an opaque cylindrical container holds a bell. Although the pet can move the toy to ring the bell, there is little visual stimulus from the opaque container.

Various products for holding catnip are shown in U.S. Pat. Nos. 1,302,174; 2,086,631; and 2,718,873. These pet toys lack an adequate visual stimulus and have no audible stimulus. See also U.S. Pat. Nos. 1,265,926 and 4,928,632.

Accordingly, there is a need for a pet toy that gives multiple forms of stimulus to sustain the amusement of a pet.

SUMMARY OF THE INVENTION

In accordance with the illustrative embodiments demonstrating features and advantages of the present invention, there is provided a pet toy having a transparent container. The toy also has a visible figure slidably fitted inside the cylinder. The pet toy further has a sound means fitted inside the container for making a sound in response to motion of the container.

In a related embodiment of the same invention, a pet toy has a transparent container. Again, a visible figure is slidably fitted inside the container. This container has a spaced plurality of longitudinal slots to make the figure partially accessible.

By employing structure of the foregoing type, an improved pet toy is achieved. In a preferred embodiment, a hollow, transparent, plastic cylinder is divided into three compartments. The central and longest compartment contains an artificial mouse impregnated with catnip. Slots running along the length of the central chamber allows a pet, such as a cat, to gain partial access to the artificial mouse.

Two smaller chambers on either side of the central chamber contain a noise maker such as a jingle bell. The three compartments are separated by serrated discs that are fitted on annular shelves formed in the inside surface of the cylindrical container.

Such a pet toy provides many modes of stimulus. A cat or other pet can see the artificial mouse, and can also touch it through the partial access allowed through the longitudinal slits. The pet will also receive olfactory stimulus from the catnip impregnating the artificial mouse. The pet will be further stimulated by rolling the toy to ring the bells.

All of this combined stimulation can be achieved in a relatively compact, attractive and reliable package.

BRIEF DESCRIPTION OF THE DRAWINGS

The above brief description, as well as other objects, features and advantages of the present invention will be more fully appreciated by reference to the following detailed description of presently preferred but nonetheless illustrative embodiments in accordance with the present invention, when taken in conjunction with the accompanying drawings, wherein.

DETAILED DESCRIPTION OF THE PREFERRED EMBODIMENTS

Figure 1:
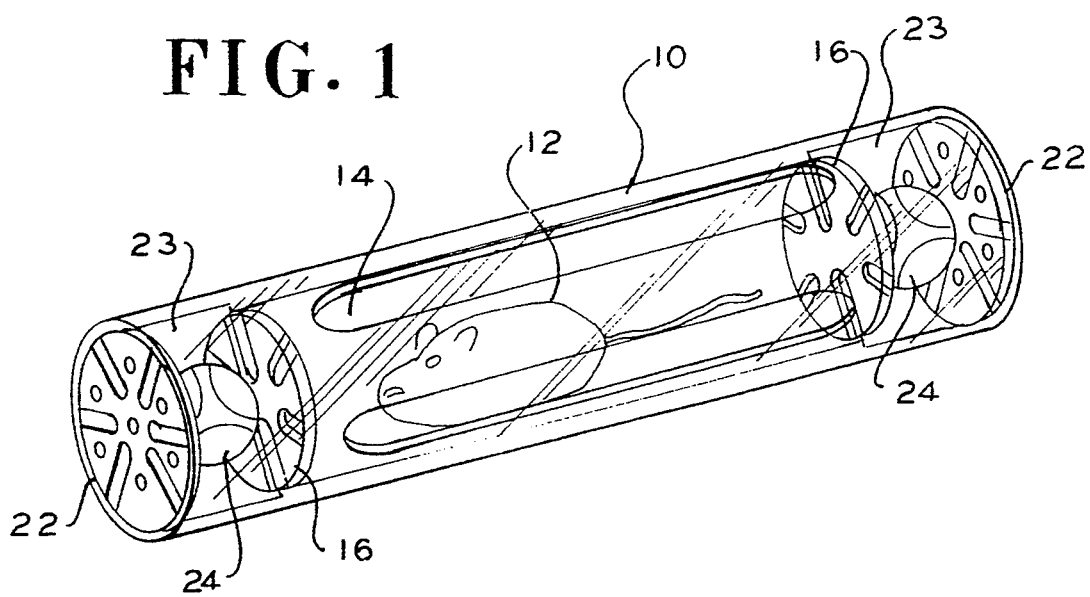
FIG. 1 is an axonometric view of a pet toy in accordance with the present invention.
Figure 2:
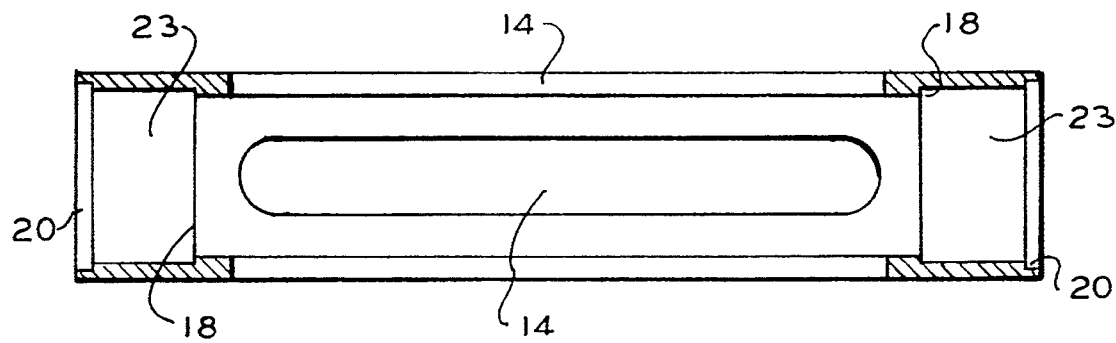
FIG. 2 is a sectional view taken along the axis of the container of FIG. 1.
Figure 3:
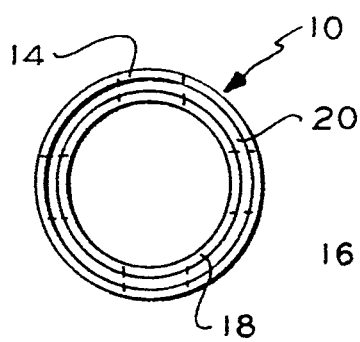
FIG. 3 is an end view of the container of FIG. 2.

Referring to FIGS. 1-3, a pet toy is shown having a cylindrical container 10. In some embodiments, container 10 can be polyhedral, ovoid, spherical, etc. Container 10 may be formed of an appropriate transparent material such as a clear acrylic, although shatterproof glass or other plastics may be used instead. In a constructed embodiment, the cylinder was about $8\frac{1}{4}''$ (21 cm) long with an outside diameter of about $1\frac{3}{4}''$ (4.4 cm). The maximum wall thickness of container 10 is preferably about $\frac{3}{8}''$ (0.95 cm), although other dimensions are contemplated. Preferably, container 10 can be made from two molded half-shells that are held together by glue or other fastening means.

Fitted within container 10 is a figure shown herein as artificial mouse 12. In this embodiment, mouse 12 is impregnated with catnip. In a preferred embodiment, artificial mouse 12 is formed of a cloth sack with artificial eyes, nose and ears sown to the sack. A simulated tail can be made of string, yarn or other strip material appended to the artificial mouse 12. It will be appreciated that the artificial mouse can be fabricated from other materials such as soft or hard plastics, metal, wood etc. Mouse 12 can be stuffed with batting or can be completely filled with catnip depending upon the desired olfactory stimulation. Preferably, artificial mouse 12 has an overall diameter that is about 75% of the inside diameter of container 10, although other diametric ratios are contemplated. Since artificial mouse 12 is smaller than the inside of the container 10, mouse 12 can freely slide inside container 10.

Container 10 has four equiangularly spaced longitudinal slots 14. Slots 14 are relatively narrow and have rounded ends. In one constructive embodiment, slots 14 were $5\frac{1}{2}''$ (14 cm) long and $\frac{5}{8}''$ (1.6 cm) wide, although other dimensions are contemplated. The width of slot 14 is chosen so that a cat can insert its claws inside container 10 without getting its paw stuck in the slot. This slot enables the cat to gain partial access and to touch the artificial mouse 12 without being able to destroy it. Additionally, the longitudinal slots 14 enable the cat to smell the catnip inside the artificial mouse. While narrow slots are shown, in some embodiments holes of various types can be employed instead. Also, the size, shape and number of the slots can be altered depending upon the desired access and strength of the toy.

A pair of spaced, transverse partitions 16 are shown mounted inside container 10. The space inside container 10 between partitions 16 is referred to herein as a primary chamber. The two ends of container 10 are bored to provide a somewhat larger inside diameter at the end of the container, thereby providing a shelf 18 on which partitions 16 can rest. Preferably, partitions 16 are glued in place. The very ends of container 10 are bored further to produce a still greater inside diameter and provide a shelf 20. End caps 22 are shown mounted inside container 10 to rest against annular shelf 20. Again, cap 22 is preferably glued in place, although a force fit, threads and other fastening means may be used instead.

The bores, shelves, slots and other shapes provided in container 10 may be produced my machining, molding or other shaping methods. In alternate embodiments, the inside of container 10 can have a pairs of closely spaced, annular walls forming a channel for holding partitions 16 and caps 22.

The two spaces between partitions 16 and caps 22 are referred to herein as adjunct chambers 23. Preferably, the distance from the inside face of partition 16 to the outside face of its corresponding end cap 22 is about 1" (2.54 cm). Mounted inside these adjunct chambers are a sound means, shown herein as a bell 24 (commonly referred to as a jingle bell). While a bell is illustrated in some embodiments, solid objects such as beads may be placed in the adjunct chambers 23 to produce a rattling noise.

Figure 4:
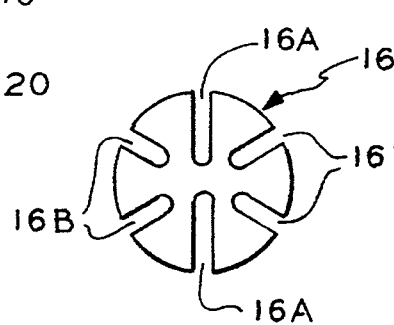
FIG. 4 is a front view of one of the partitions of FIG. 1.

Referring to FIG. 4, partition 16 is shown having six, equiangularly spaced serrations 16A and 16B. Serrations 16A and 16B are, in effect, slots piercing the full thickness of partition 16. Two relatively large serrations 16A are shown at opposite positions (the 12 o'clock and 6 o'clock positions in this view). Four smaller serrations 16B are shown at 60 degree intervals with respect to the larger serrations 16A. In this embodiment, partition 16 has an overall diameter of 1.47" (3.7 cm) and is about $\frac{1}{8}$" (0.32 cm) thick, although other dimensions are contemplated.

Figure 5:
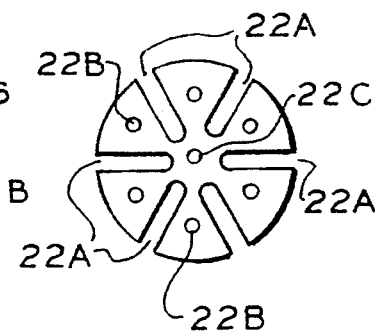
FIG. 5 is an front view of an end cap of FIG. 1.

Referring to FIG. 5, end cap 22 is shown with six equiangularly spaced serrations 22A. Serrations 22A are basically slots piercing the entire thickness of cap 22. Six peripheral holes 22 between the serrations 22A also pierce the thickness of cap 22. A concentric hole 22C makes the seventh hole through cap 22. The serrations and holes in partitions 16 and caps 22 allow sound to readily escape from the adjunct chambers 23.

To facilitate an understanding of the principles associated with the foregoing apparatus, its operation will be briefly described. The toy may be assembled as shown in FIG. 1. In some embodiments, partitions 16 and end cap 22 can be removable, in that case, the artificial mouse can be replaced or recharged with catnip.

The toy as shown is placed before a pet such as a cat. The cat will instinctively be attracted to the artificial mouse 12. On drawing near, the cat will smell the catnip within the artificial mouse 12 through slots 14. The cat will then become excited and attempt to touch the catnip-impregnated mouse. The slots 14 will encourage the cat to attempt to claw or touch the artificial mouse 12. Slots 14, however, are not so wide that the cat's paw will be caught inside slot 14. The ability to touch but not fully grasp the artificial mouse will further excite the cat.

Still stimulated, the cat will inevitably strike at the toy and cause it to roll. The rolling of the toy will cause the artificial mouse 12 to jump as it shifts position, simulating a life-like movement and further exciting the cat. In addition, the rolling of the toy will cause bells 24 to tumble and ring. Since there are serrations and holes in caps 22 and partition 16, the ringing will readily issue from the toy.

It is to be appreciated that various modifications may be implemented with respect to the above described preferred embodiments. It will be appreciated that the toy can be made of various materials and can be transparent, translucent, etc. In addition, the various components can be colored to please the pet and pet owner. While three chambers are illustrated, in some embodiments only two or one cheer will be employed. In some embodiments, the artificial mouse and bell can be placed inside the same chamber. While an artificial mouse is shown, in some embodiments a different figure, including various abstract shapes can be used instead. Furthermore, more than one figure can be placed within the container. In some embodiments, the figure will contain the sound generating capacity. Additionally, the size and shape of the toy can be altered depending upon the pet and the desired amount of stimulation, the desired strength, etc.

Obviously, many modifications and variations of the present invention are possible in light of the above teachings. It is therefore to be understood that within the scope of the appended claims, the invention may be practiced otherwise than as specifically described.

I claim:

1. A pet toy comprising:
   a transparent container having a primary chamber and an adjunct chamber;
   at least one transverse partition mounted inside said container to separate said primary and said adjunct chambers;
   a visible figure slidably fitted inside said primary chamber, longitudinal slots being located along said primary chamber to make said figure partially accessible; and
   sound means fitted inside said container for making a sound in response to motion of said container, said sound means being fitted inside said adjunct chamber.

2. A pet toy according to claim 1 wherein said container has a spaced plurality of longitudinal slots to make said figure partially accessible.

3. A pet toy according to claim 1 wherein said container, has a primary chamber and an adjunct chamber, said figure being fitted inside said primary chamber, said sound means being fitted inside said adjunct chamber.

4. A pet toy according to claim 1 wherein said figure comprises an artificial mouse.

5. A pet toy according to claim 1 wherein said sound means comprises a bell.

6. A pet toy according to claim 4 wherein said sound means comprises a bell.

7. A pet toy according to claim 3 wherein said longitudinal slots are located along said primary chamber to make said figure partially accessible.

8. A pet toy according to claim 1 wherein said container is cylindrical.

9. A pet toy according to claim 8 comprises:
   at least one transverse partition mounted inside said container to separate said primary and said adjunct chambers.

10. A pet toy according to claim 8 comprises:
a spaced pair of transverse partitions mounted inside said container, said primary chamber being located between said partitions.

11. A pet toy according to claim 10 wherein said sound means comprises:
a spaced pair of bells separately mounted within said container on opposite sides of said primary chamber outside said partitions.

12. A pet toy according to claim 11 wherein said figure comprises an artificial mouse.

13. A pet toy according to claim 12 wherein said figure is adapted to be impregnated with catnip 14. A pet toy according to claim 13 comprising:
a pair of end caps mounted on opposite ends of said container.

15. A pet toy according to claim 14 wherein said partitions are serrated.

16. A pet toy according to claim 12 wherein said end caps comprise serrated disks.

17. A pet toy comprising:
a transparent container;
a visible figure slidably fitted inside said container, said container having a spaced plurality of longitudinal slots to make said figure partially accessible, said slots being sized and positioned to allow said visible figure to slide along a path while remaining (a) adjacent to at least one of said slots, and (b) touchable through at least one of said slots.

18. A pet toy according to claim 17 wherein said figure comprises an artificial mouse.

19. A pet toy according to claim 17 wherein said container is cylindrical.

20. A pet toy according to claim 17 comprises:
a spaced pair of transverse partitions mounted inside said container, said figure being located between said partitions.

21. A pet toy according to claim 20 wherein said figure comprises an artificial mouse.

22. A pet toy according to claim 21 wherein said figure is adapted to be impregnated with catnip.

23. A pet toy according to claim 22 comprising:
a pair of end caps mounted on opposite ends of said container.

24. A pet toy according to claim 23 wherein said partitions are serrated.

* * * * *